(12) United States Patent
Nagata et al.

(10) Patent No.: US 10,220,730 B2
(45) Date of Patent: Mar. 5, 2019

(54) VEHICLE SEAT SLIDING DEVICE

(71) Applicant: AISIN SEIKI KABUSHIKI KAISHA, Kariya-shi (JP)

(72) Inventors: Toshiaki Nagata, Chita-gun (JP); Yuta Murakami, Nagoya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/660,392

(22) Filed: Jul. 26, 2017

(65) Prior Publication Data
US 2018/0029504 A1 Feb. 1, 2018

(30) Foreign Application Priority Data
Jul. 29, 2016 (JP) .................... 2016-149442

(51) Int. Cl.
*F16M 13/00* (2006.01)
*B60N 2/06* (2006.01)
(52) U.S. Cl.
CPC .................... *B60N 2/067* (2013.01)
(58) Field of Classification Search
USPC ........................................................ 248/636
See application file for complete search history.

(56) References Cited

U.S. PATENT DOCUMENTS

| | | | | |
|---|---|---|---|---|
| 4,802,374 A * | 2/1989 | Hamelin | ............... | B60N 2/0232 248/429 |
| 5,048,786 A * | 9/1991 | Tanaka | ................. | B60N 2/0232 248/429 |
| 5,711,184 A * | 1/1998 | Pryor | ................... | B60N 2/0224 248/429 |
| 5,797,293 A * | 8/1998 | Chaban | ................ | B60N 2/0232 248/429 |
| 5,816,555 A * | 10/1998 | Ito | .......................... | B60N 2/067 248/424 |
| 5,860,319 A * | 1/1999 | Via | ....................... | B60N 2/0232 248/429 |
| 6,220,642 B1 * | 4/2001 | Ito | ........................ | B60N 2/0232 248/429 |

(Continued)

FOREIGN PATENT DOCUMENTS

| | | |
|---|---|---|
| JP | 2010-6122 | 1/2010 |
| JP | 2011-31667 | 2/2011 |

*Primary Examiner* — Monica E Millner
(74) *Attorney, Agent, or Firm* — Oblon, McClelland, Maier & Neustadt, L.L.P.

(57) ABSTRACT

A vehicle seat sliding device includes: a lower rail configured to be fixed to a vehicle floor; an upper rail slidably engaging with the lower rail and configured to support a vehicle seat upward; a screw rod is rotatably supported by a first rail configuring one side of the lower and upper rails; a drive unit driving rotation of the screw rod; a nut member provided with a screw hole into which the screw rod is screwed; and a nut holding member fixed to a second rail configuring the other side of the lower and upper rails, and holding the nut member, in which one and the other of the nut and nut holding members are provided with a support shaft and an arcuate groove, respectively, and the nut holding member regulates integral rotation of the screw rod and the nut member, and allows the nut member to rotate around a second rotation axis.

8 Claims, 8 Drawing Sheets

(56) References Cited

U.S. PATENT DOCUMENTS

| | | | | |
|---|---|---|---|---|
| 6,948,693 | B2* | 9/2005 | Goodbred | B60N 2/0232 248/424 |
| 7,051,986 | B1* | 5/2006 | Taubmann | B60J 7/0573 248/429 |
| 7,571,666 | B2* | 8/2009 | Borbe | B60N 2/0232 297/344.1 |
| 8,226,063 | B2* | 7/2012 | Weber | B60N 2/067 248/429 |
| 8,523,263 | B2* | 9/2013 | Kimura | B60N 2/0705 248/429 |
| 8,733,725 | B2* | 5/2014 | Kimura | B60N 2/0232 248/429 |
| 9,586,500 | B2* | 3/2017 | Shimizu | B60N 2/067 |
| 2003/0173809 | A1* | 9/2003 | Moradell | B60N 2/067 297/344.1 |
| 2009/0243327 | A1* | 10/2009 | Koga | B60N 2/067 296/65.15 |
| 2010/0013284 | A1* | 1/2010 | Koga | B60N 2/067 297/344.1 |
| 2010/0044542 | A1* | 2/2010 | Koga | B60N 2/067 248/429 |
| 2010/0065708 | A1* | 3/2010 | Koga | B60N 2/067 248/429 |
| 2010/0219813 | A1* | 9/2010 | Ito | B60N 2/0232 324/207.22 |
| 2011/0308340 | A1* | 12/2011 | Bosecker | B60N 2/067 74/89.32 |
| 2013/0186217 | A1* | 7/2013 | Enokijima | B60N 2/067 74/89.33 |
| 2015/0298581 | A1* | 10/2015 | Nagata | B60N 2/067 248/429 |

\* cited by examiner

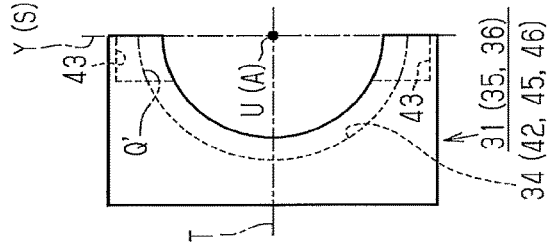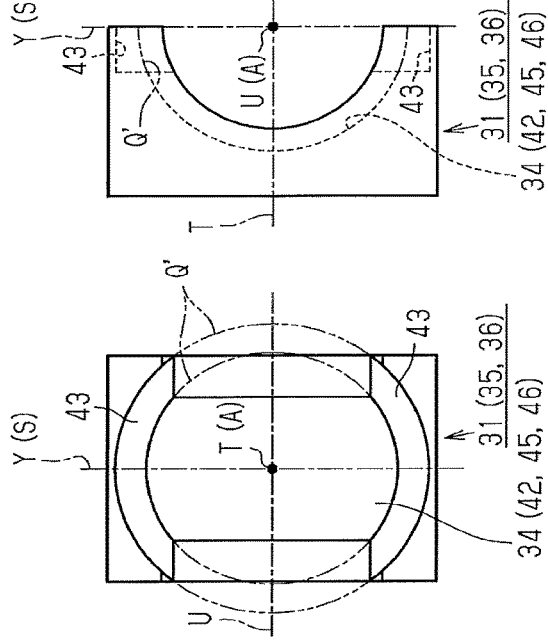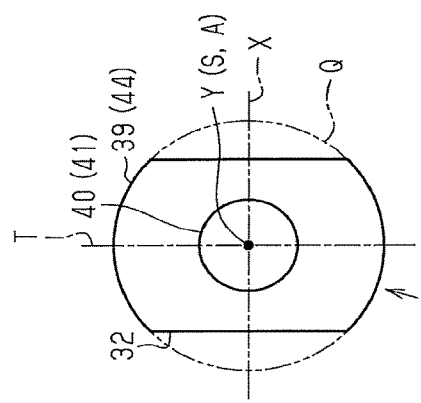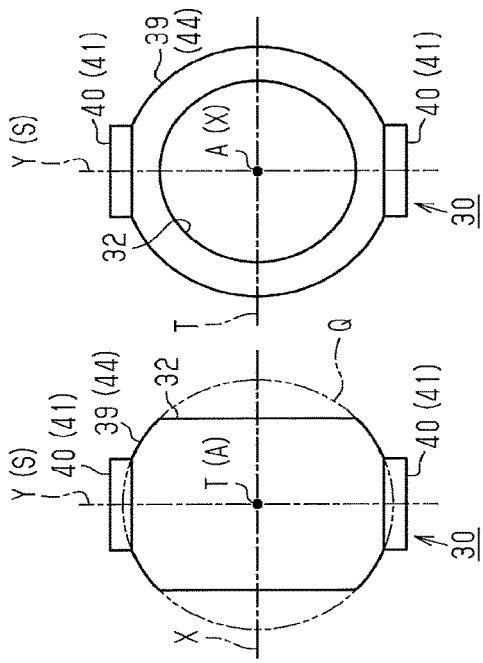

VEHICLE SEAT SLIDING DEVICE

CROSS REFERENCE TO RELATED APPLICATIONS

This application is based on and claims priority under 35 U.S.C. § 119 to Japanese Patent Application 2016-149442, filed on Jul. 29, 2016, the entire contents of which are incorporated herein by reference.

TECHNICAL FIELD

This disclosure relates to a vehicle seat sliding device equipped with a drive source.

BACKGROUND DISCUSSION

In the related art, there is a seat sliding device for a vehicle that includes a lower rail configured to be fixed to a vehicle floor and an upper rail which slidably engages with the lower rail and supports a seat upward. In such a seat sliding device, drive force from a motor or the like as a drive source enables the upper rail to slide with respect to the lower rail in a vehicle frontward-rearward direction.

For example, JP 2010-06122A (Reference 1) discloses a seat sliding device that includes a screw rod supported by an upper rail in a rotatable manner and a nut member fixed to a lower rail. The seat sliding device has a configuration in which the screw rod screwed into the nut member is driven by drive force.

Further, the seat sliding device disclosed in Reference 1 includes a fixing portion fixed to the upper rail, a bearing (cylinder portion) provided at one end of the screw rod, and an elastic body (eccentricity absorbing leg) that connects the fixing portion and the bearing. In such a configuration, eccentric rotation of the screw rod is absorbed through elastic deformation of the elastic body.

In addition, JP 2011-31667A (Reference 2) discloses a seat sliding device in which a nut member is fixed to a lower rail via a fixing bracket. Further, a damper made of an elastic body is interposed between the nut member and the fixing bracket. In such a configuration, the damper absorbs vibration generated from a drive source.

Incidentally, as described above, in the configuration in which the screw rod screwed into the nut member rotates, problems arise in that an axis line of the screw rod is inclined with respect to an axis line of a screw hole provided in the nut member, so-called "skewness" occurs, and thereby "defective mesh" is performed between the nut member and the screw rod. However, in a structure in which eccentric rotation or vibration of the screw rod is absorbed by using the elastic body like the related art, it is not possible to solve such problems in some cases. In this manner, there is a concern that a smooth operation of the screw rod is interrupted.

Thus, a need exists for a vehicle seat sliding device which is not susceptible to the drawback mentioned above.

SUMMARY

It is preferable that a vehicle seat sliding device according to an aspect of this disclosure includes: a lower rail configured to be fixed to a vehicle floor; an upper rail that slidably engages with the lower rail and configured to support a vehicle seat upward; a screw rod that is rotatably supported by a first rail which configures one side of the lower rail and the upper rail; a drive unit that drives rotation of the screw rod; a nut member provided with a screw hole into which the screw rod is screwed; and a nut holding member that is fixed to a second rail which configures the other side of the lower rail and the upper rail, and that holds the nut member, one of the nut member and the nut holding member is provided with a support shaft that forms a first rotation axis of the nut member, the other member of the nut member and the nut holding member is provided with an arcuate groove with which the support shaft engages, and the nut holding member regulates integral rotation of the screw rod and the nut member, based on an engagement relationship between the support shaft and the arcuate groove, allows the nut member to rotate around the first rotation axis, and allows the nut member to rotate around a second rotation axis orthogonal to an axis line of the screw hole and the first rotation axis, with the support shaft sliding in an extending direction of the arcuate groove.

BRIEF DESCRIPTION OF THE DRAWINGS

The foregoing and additional features and characteristics of this disclosure will become more apparent from the following detailed description considered with the reference to the accompanying drawings, wherein:

FIG. 7 illustrates a nut member, FIG. 7A is a plan view, FIG. 7B is a side view, and FIG. 7C is a front view;

FIG. 8 illustrates a nut holding member, FIG. 8A is a plan view, FIG. 8B is a side view, and FIG. 8C is a front view;

FIG. 11 illustrates an example of the nut member.

FIG. 12 illustrates an example of the nut holding member.

DETAILED DESCRIPTION

Hereinafter, an embodiment of a vehicle seat sliding device will be described with reference to the figures.

Figure 1:
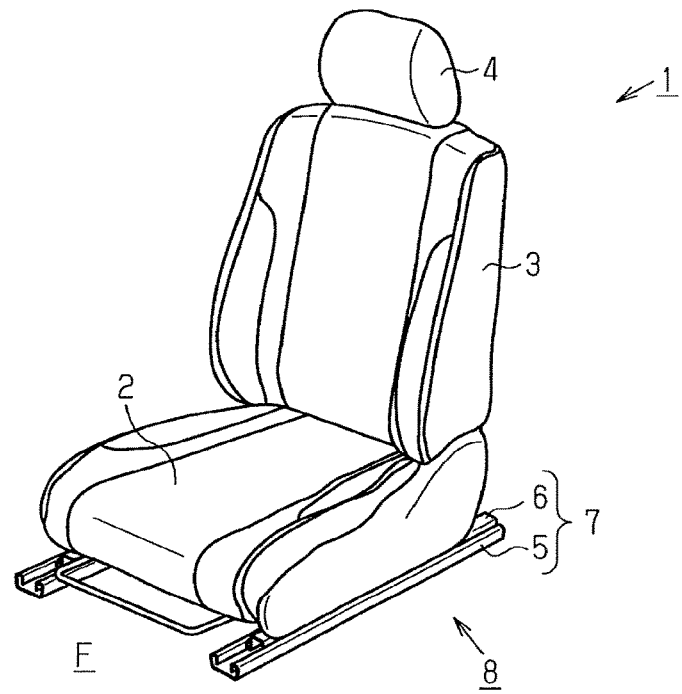
FIG. 1 is a perspective view of a seat.

As illustrated in FIG. 1, a seat 1 for a vehicle includes a seat cushion 2 and a seatback 3 that is tiltable with respect to a rear end portion of the seat cushion 2. A headrest 4 is provided on an upper end of the seatback 3.

In addition, a pair of right and left lower rails 5 extending in a vehicle frontward-rearward direction are provided on a floor F of the vehicle. Further, upper rails 6 are mounted on the respective lower rails 5, and the upper rails engage with the lower rails 5 and are slidable on the corresponding lower rails 5 in an extending direction thereof. The seat 1 of the embodiment is supported upward from a seat sliding rail 7 configured to have the lower rail 5 and the upper rail 6.

In other words, the seat 1 of the embodiment is fixed to the upper rail 6 in a state in which the seat straddles on the right and left seat sliding rails 7. In the embodiment, the upper rail 6 relatively moves with respect to the lower rail 5, and thereby a seat sliding device 8 that is capable of adjusting front and rear positions of the seat 1 is formed.

Figure 2:
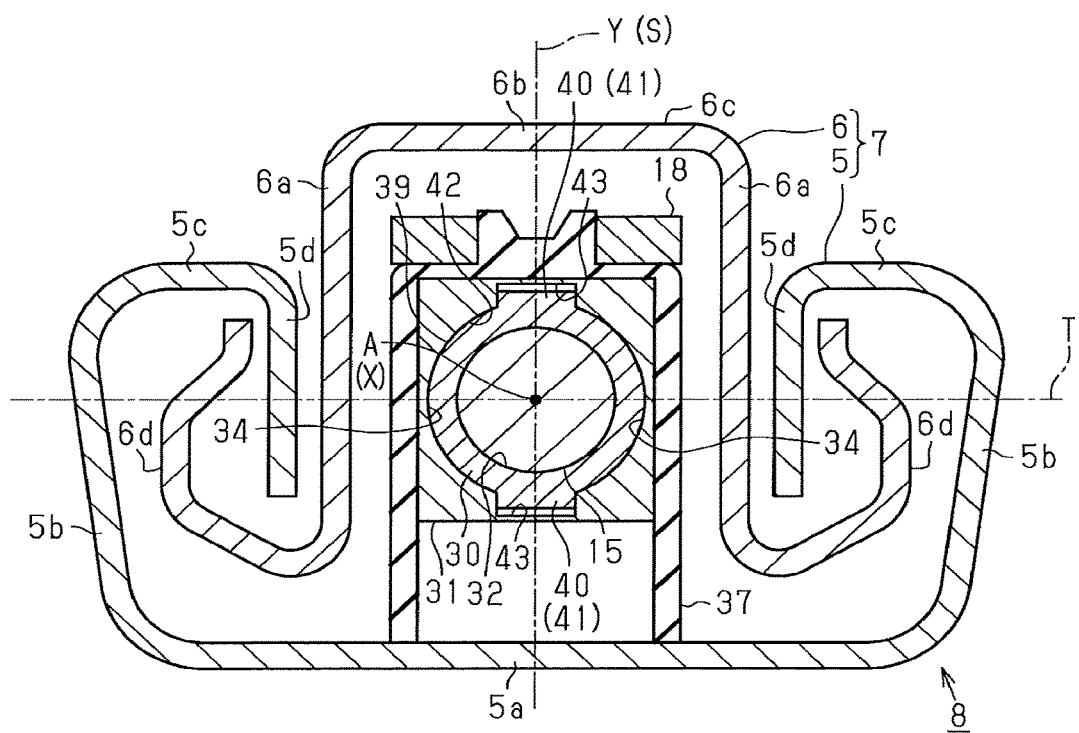
FIG. 2 is a sectional view of a seat sliding device (a sectional view in a direction orthogonal to an extending direction of a sliding rail)

As illustrated in FIG. 2, the lower rail 5 has a flat plate-shaped bottom wall portion 5a that is fixed to the floor F (refer to FIG. 1) of the vehicle. In addition, a pair of outer wall portions 5b are provided in an upright manner to face each other at both ends of the bottom wall portion 5a in a width direction thereof (a horizontal direction in FIG. 2). Further, upper wall portions 5c having a flange shape are formed to extend toward the inner side in the width direction on the upper ends (end portions of the upper end in FIG. 2) of the outer wall portions 5b. Inner wall portions 5d folded downward are formed at distal ends of the upper wall portions 5c.

The upper rail 6 has a pair of side wall portions 6a that face each other in the width direction. In addition, the upper rail 6 has plate-shaped upper wall portions 6b that are connected to the both-side wall portions 6a. The upper rail 6 of the embodiment has an upper rail main body 6c having a substantially U-shaped cross-section, which is formed by the both-side wall portions 6a and the upper wall portion 6b and is disposed between both of the inner wall portions 5d on the lower rail 5 side. Thus, the upper rail is mounted on the lower rail 5.

In addition, the upper rail 6 has folded portions 6d that are folded upward on the outer sides in the width direction from the lower end of the side wall portion 6a. The folded portion 6d is disposed in a space surrounded by the outer wall portion 5b, the upper wall portion 5c, and the inner wall portion 5d which configure the lower rail 5, and thereby the folded portion is restricted from relatively moving in an upward direction and the width direction with respect to the lower rail 5.

A plurality of rolling elements (not illustrated) are interposed to face each other in a rail width direction between the outer wall portion 5b of the lower rail 5 and the folded portion 6d of the upper rail 6. The rolling elements roll to come into sliding contact with the outer wall portion 5b of the lower rail 5 and the folded portion 6d of the upper rail 6, and thereby smooth relative movement of the upper rail 6 is secured with respect to the lower rail 5.

Figure 3:
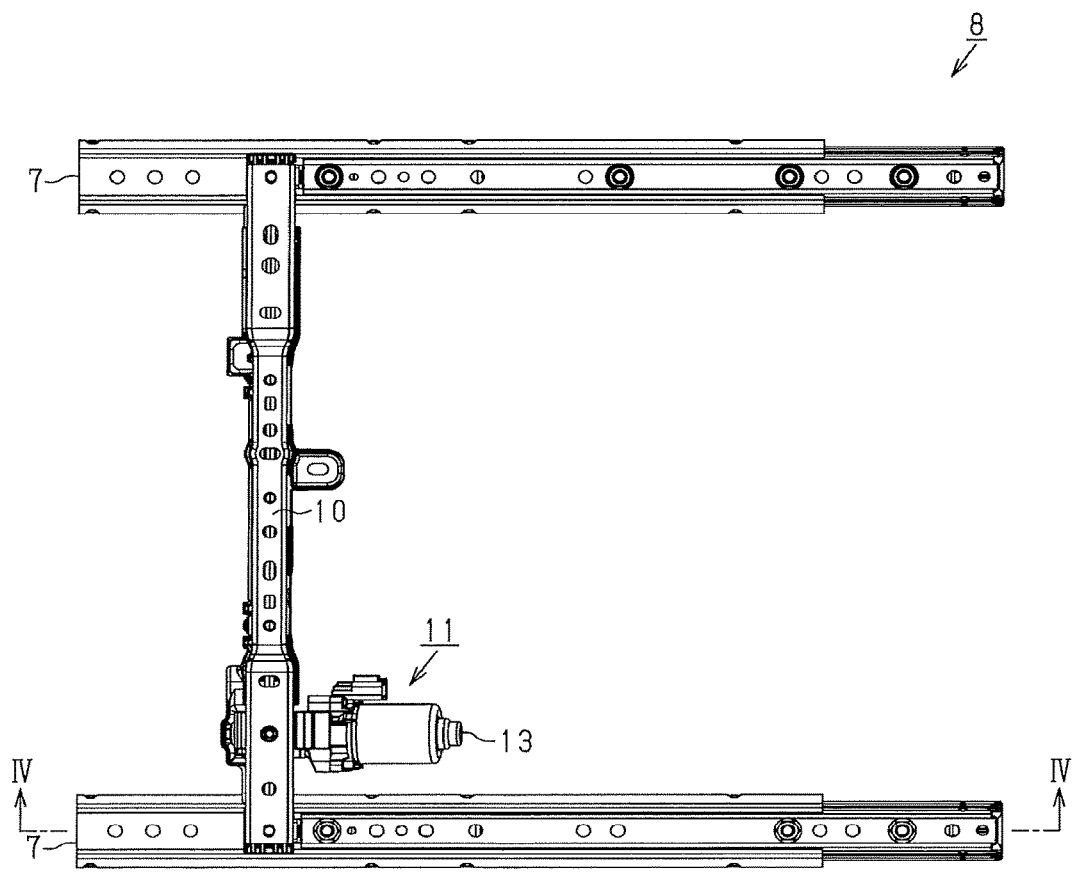
FIG. 3 is a top view of the seat sliding device.
Figure 4:
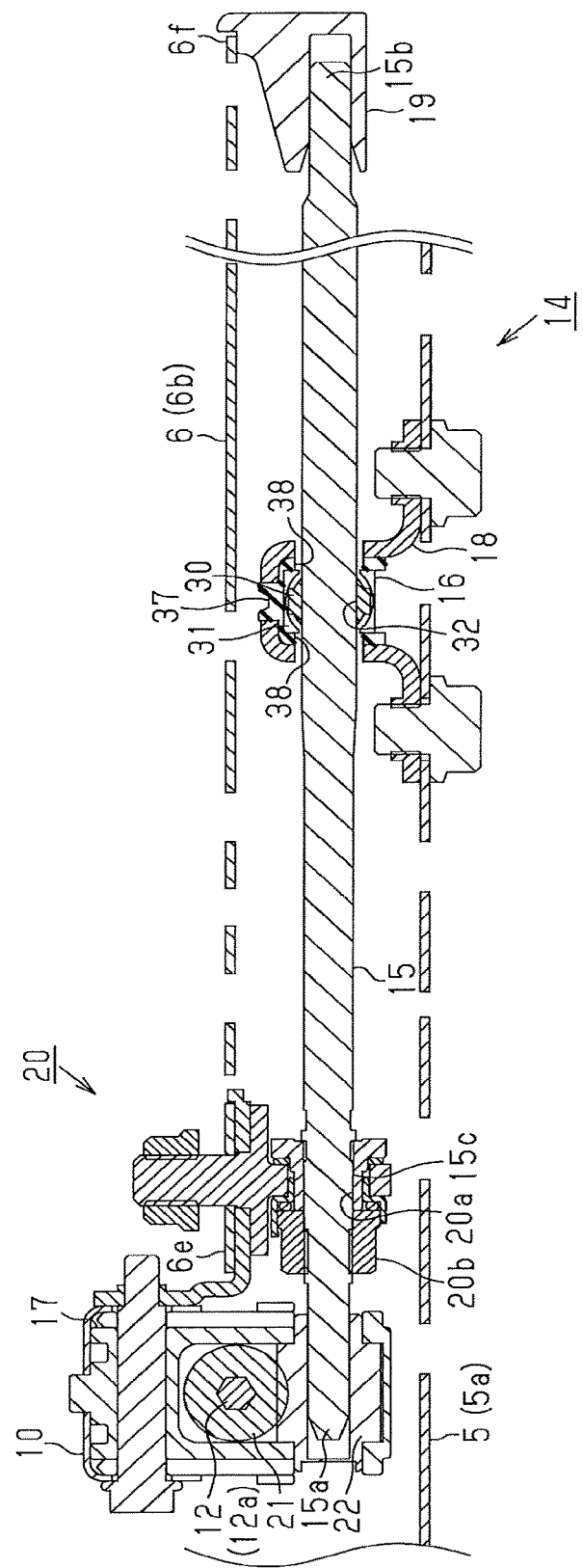
FIG. 4 is a sectional view of the seat sliding device (a cross-section taken along line IV-IV in FIG. 3)

In addition, as illustrated in FIGS. 3 and 4, the seat sliding device 8 of the embodiment includes a bracket 10 that straddles both of the seat sliding rails 7, an actuator 11 supported by the bracket 10, and a transmission shaft 12 that is driven to rotate by the actuator 11.

In the seat sliding device 8 of the embodiment, the actuator 11 is suspended on a lower side of the bracket 10. In addition, the transmission shaft 12 extends in a longitudinal direction of the bracket 10 having a substantially elongated plate shape in a substantially orthogonal state to the seat sliding rails 7. Further, the actuator 11 of the embodiment drives rotation of the transmission shaft 12 with a motor 13 as a drive source. The seat sliding device 8 of the embodiment has a configuration in which drive force of the motor 13 is transmitted via the transmission shaft 12 to a rail drive mechanism 14 interposed between the lower rails 5 and the upper rails 6 which configure the seat sliding rails 7.

As illustrated in FIG. 4, the rail drive mechanism 14 of the embodiment includes a screw rod 15 extending in an extending direction of the seat sliding rail 7, a slide-driving nut member 16 that is screwed to the screw rod 15, and a gear box 17 that changes rotation of the transmission shaft 12 described above into rotation of the screw rod 15. The slide-driving nut member 16 of the embodiment is fixed to the bottom wall portion 5a of the lower rail 5 via a fixing bracket 18. In addition, the gear box 17 of the embodiment is fixed to a front end portion 6e (end portion on the left side in FIG. 4) of the upper rail 6. The screw rod 15 of the embodiment has a configuration in which, in a state in which one end side (front end portion 15a) of the screw rod is connected to the gear box 17, the other end side (rear end portion 15b) thereof is supported by a bearing member 19 provided in a rear end portion 6f (end portion on the right side in FIG. 4) of the upper rail 6.

In other words, in the embodiment, the upper rail 6 configures a first rail and the lower rail 5 configures a second rail. In addition, the gear box 17 of the embodiment includes a first gear 21 that is connected to a shaft end portion 12a of the transmission shaft 12, and a second gear 22 that is connected to the front end portion 15a of the screw rod 15 in a state of meshing with the first gear 21. In the seat sliding device 8 of the embodiment, the drive force of the actuator 11 (motor 13) is transmitted to the screw rod 15 in this manner, and thus a drive unit that drives the rotation of the screw rod 15 is formed.

In addition, in the rail drive mechanism 14 of the embodiment, the screw rod 15 screwed into the slide-driving nut member 16 rotates, and thereby the screw rod 15 relatively moves with respect to the slide-driving nut member 16 in an axial direction. The seat sliding device 8 of the embodiment has a configuration in which the upper rail 6 that supports the screw rod 15 moves forward and rearward with respect to the lower rail 5 provided with the slide-driving nut member 16.

Further, in the seat sliding device 8 of the embodiment, a support 20 that supports the screw rod 15 by the upper rail 6 is provided between the front end portion 15a and the rear end portion 15b of the screw rod 15. Specifically, the support 20 is provided with an insertion hole 20a into which a non-threaded portion 15c provided at an end portion of the screw rod 15 in the axial direction is inserted. In addition, the non-threaded portion 15c of the screw rod 15 is provided with a pinch portion 20b that pinches the support 20 in the axial direction. In this manner, the seat sliding device 8 is configured to receive a load in the axial direction generated between the screw rod 15 and the upper rail 6.

Next, the slide-driving nut member 16 provided in the seat sliding device 8 of the embodiment will be described.

Figure 5:
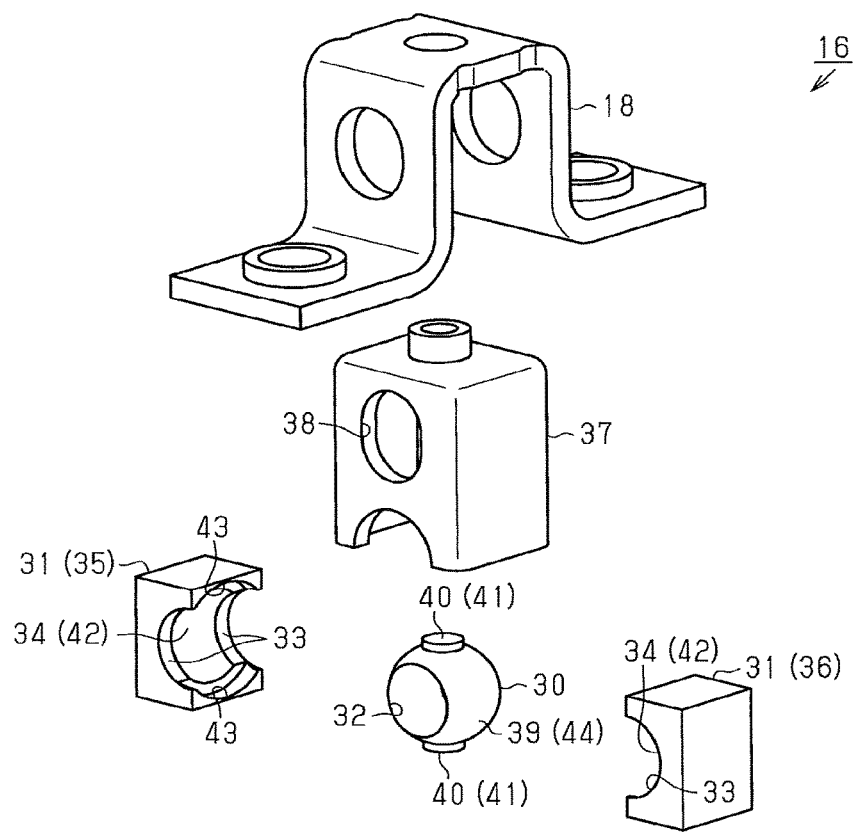
FIG. 5 is an exploded perspective view of a slide-driving nut member.

As illustrated in FIGS. 4 and 5, the slide-driving nut member 16 includes a nut member 30 provided with a screw hole 32, into which the screw rod 15 is screwed, and a nut holding member 31 that holds the nut member 30 and is fixed to the lower rail 5 (bottom wall portion 5a) via the fixing bracket 18.

As illustrated in FIGS. 5 to 8, the nut member 30 of the embodiment has a substantially spherical external shape. The nut holding member 31 of the embodiment substantially has a cubic shape. In addition, the nut holding member 31 is provided with a through-hole 33 into which the screw rod 15 is inserted. Further, the nut holding member 31 is provided with a nut accommodating portion 34 in such a way that an intermediate region of the through-hole 33 increases in diameter. The nut holding member 31 of the embodiment is configured to hold the nut member 30 in a state in which the nut member 30 is accommodated inside the nut accommodating portion 34, and thereby the nut member complies (integrally rotate) with the rotation of the screw rod 15 and movement of the nut member in the axial direction is regulated with respect to the lower rail 5.

More specifically, in the seat sliding device 8 of the embodiment, the nut holding member 31 is formed by assembly of both of a first holding portion 35 and a second holding portion 36 into which the nut holding member 31 is bisected in the rail width direction (refer to FIG. 2, horizontal direction in the figure) along an axis line U of the through-hole 33. The nut holding member 31 of the embodiment is configured to hold the nut member 30 on the inner side of the nut accommodating portion 34 in such a way that the nut member is pinched between the first and second holding portions 35 and 36.

Figure 6:
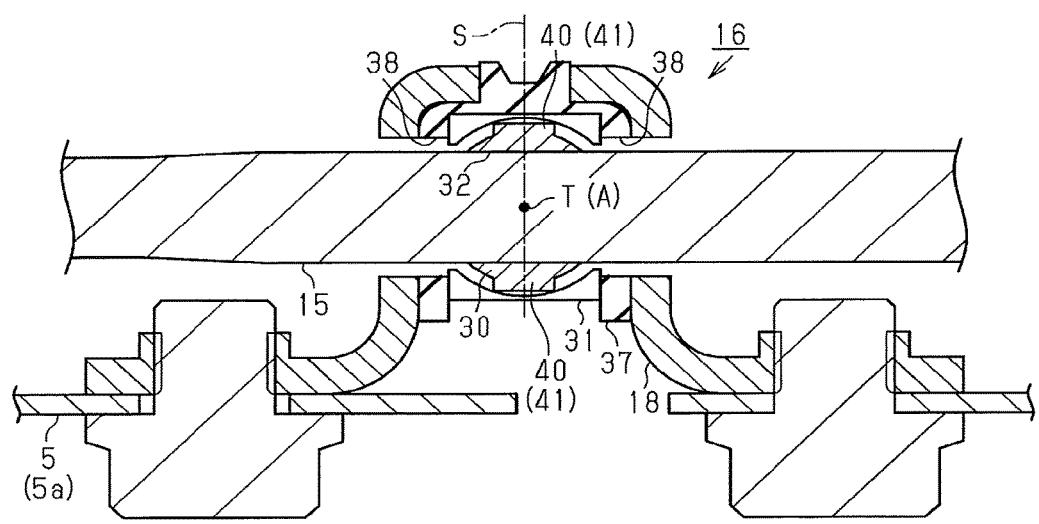
FIG. 6 is a sectional view of the slide-driving nut member in an assembly state to a lower rail (sectional view in the extending direction of the sliding rail)

In addition, as illustrated in FIGS. 2, 5, and 6, the seat sliding device 8 of the embodiment includes a damper 37 that is interposed between the nut holding member 31 and the fixing bracket 18. Specifically, the damper 37 is made of an elastic body. In addition, the damper 37 has an external shape of a substantially quadrangular box shape. Further, the damper 37 is provided with an insertion hole 38 of the screw rod 15. The nut holding member 31 of the embodiment is configured to be held by the fixing bracket 18 in a state in which the damper 37 is mounted on an outer side thereof.

More specifically, as illustrated in FIGS. 2 and 5 to 7, the nut member 30 of the embodiment has a support shaft 40 that projects from an outer circumferential surface 39. Specifically, the support shaft 40 is formed of a pair of shaft-shaped projecting portions 41 that have an external shape of a substantial cylinder shape and are provided on the outer circumferential surface 39 of the nut member 30. The support shaft 40 is configured to have a positional relationship in which an axis line Y thereof is orthogonal to an axis line X of the screw hole 32 into which the screw rod 15 is screwed.

In addition, as illustrated in FIGS. 2, 5, 6, and 8, in the nut holding member 31 of the embodiment, an inner circumferential surface 42 of the nut accommodating portion 34 is a recessed curved surface corresponding to the outer circumferential surface 39 of the nut member 30 having a substantial spherical shape. In addition, the inner circumferential surface 42 of the nut accommodating portion 34 is provided with an arcuate groove 43 extending in the longitudinal direction of the lower rail 5 in a state in which the nut holding member 31 is fixed to the lower rail 5. In the nut holding member 31 of the embodiment, the arcuate groove 43 is provided at an assembly position of the first and second holding portions 35 and 36 that configure the nut holding member 31, that is, at two positions opposite in the vertical direction on the inner circumferential surface 42 of the nut accommodating portion 34. The nut holding member 31 of the embodiment is configured to hold the nut member 30 in a state in which the support shaft 40 of the nut member 30 engages with the arcuate groove 43 and the outer circumferential surface 39 of the nut member 30 comes into contact with the inner circumferential surface 42 of the nut accommodating portion 34.

Specifically, as illustrated in FIGS. 2 and 5 to 8, the support shaft 40 of the nut member 30 rotatably engages with the arcuate groove 43 of the nut holding member 31. In this manner, the nut holding member 31 of the embodiment is configured to hold the nut member 30 in a state of allowing the nut member 30 to rotate around a first rotation axis S formed of the axis line Y of the support shaft 40.

Further, relative movement of the support shaft 40 of the nut member 30 in a groove width direction is regulated with respect to the arcuate groove 43 of the nut holding member 31, and engages with the arcuate groove in a state of being slidable in the extending direction of the arcuate groove 43. In this manner, the nut holding member 31 of the embodiment is configured to hold the nut member 30 in a state of allowing the nut member 30 to rotate around a second rotation axis T which is orthogonal to the axis line X of the screw hole 32 and the axis line Y of the support shaft 40 that forms the first rotation axis S, that is, which passes through an intersection point A of the axis line X of the screw hole 32 and the axis line Y of the support shaft 40.

More specifically, as illustrated in FIG. 2, in the nut holding member 31 of the embodiment, the first rotation axis S extending in the vertical direction (vertical direction in FIG. 2) of the seat sliding rail 7 and the second rotation axis T extending in the rail width direction (horizontal direction in FIG. 2) are formed, based on an engagement relationship between the arcuate groove 43 and the support shaft 40 of the nut member 30. In this manner, the nut member 30 held in the nut accommodating portion 34 is configured to be allowed to rotate in the rail width direction (around the first rotation axis S) and the vertical direction (around the second rotation axis T).

In addition, as illustrated in FIGS. 7A to 7C, in the seat sliding device 8 of the embodiment, the outer circumferential surface 39 of the nut member 30 is formed of a curved portion 44 that configures a part of a spherical surface Q around the intersection point A of the axis line X of the screw hole 32 and the first rotation axis S and the second rotation axis T. Further, as illustrated in FIGS. 8A to 8C, the inner circumferential surface 42 of the nut accommodating portion 34 which is formed of a contact portion 45 with the respect to the curved portion 44 on the nut holding member 31 side is formed to have a curved shape along the curved portion 44, that is, a curved portion 46 that configures a part of a spherical surface Q' which is concentric with the spherical surface Q. In this manner, in the nut holding member 31 of the embodiment, the nut member 30 is smoothly rotatable around the first rotation axis S and the second rotation axis T.

As described above, according to the embodiment, it is possible to achieve the following effects.

(1) The seat sliding device 8 includes the nut member 30 provided with the screw hole 32, into which the screw rod 15 is screwed, and the nut holding member 31 that holds the nut member 30 in a state of being fixed to the lower rail 5. The nut member 30 has the support shaft 40 that forms the first rotation axis S of the nut member 30. In addition, the nut holding member 31 has the arcuate groove 43 with which the support shaft 40 engages. Further, the nut holding member 31 regulates integral rotation of the screw rod 15 and the nut member 30 and allows the nut member 30 to rotate around the first rotation axis S, based on the engagement relationship between the arcuate groove 43 and the support shaft 40 of the nut member. In the nut holding member 31 of the embodiment, the support shaft 40 slides in the extending direction of the arcuate groove 43, and thereby the nut member 30 is allowed to rotate around the second rotation axis T orthogonal to the axis line X of the screw hole 32 and the first rotation axis S.

In the configuration, the nut member 30 rotates around the first rotation axis S and the second rotation axis T in compliance with a tilt of the screw rod 15, and thereby it is difficult for so-called "skewness" of tilting of the screw rod 15 with respect to the axis line X of the screw hole 32 to occur. In this manner, the occurrence of defective mesh between the nut member 30 and the screw rod 15 is reduced, and thus it is possible to ensure a smooth operation of the screw rod.

(2) The support shaft 40 of the nut member 30 is formed to have the pair of shaft-shaped projecting portions 41 provided on the outer circumferential surface 39 of the nut member 30. In addition, the nut holding member 31 has the nut accommodating portion 34. Further, the arcuate groove 43 on the nut holding member 31 side is provided in the inner circumferential surface 42 of the nut accommodating portion 34. The arcuate groove 43 is configured to extend in the longitudinal direction of the lower rail 5 in a state in which the nut holding member 31 is fixed to the lower rail 5.

In the configuration, it is possible to form the first rotation axis S and the second rotation axis T which intersect with the longitudinal direction of the lower rail 5 in a state in which the rotation axes and the longitudinal direction are orthogonal to each other. In this manner, it is possible to cause the nut member 30 to rotate in compliance with the screw rod 15 that tilts in the vertical direction and the rail width direction of the lower rail 5. As a result, the occurrence of defective mesh between the nut member 30 and the screw rod 15 is reduced, and thus it is possible to ensure a smooth operation of the screw rod.

(3) In addition, the outer circumferential surface 39 of the nut member 30 is formed of the curved portion 44 that configures a part of the spherical surface Q around the intersection point A of the first rotation axis S and the second rotation axis T (and the axis line X of the screw hole 32). The nut holding member 31 is provided with the contact portion 45 that comes into contact with the curved portion 44.

In the configuration, sliding of the curved portion 44 on the nut member 30 side and the contact portion 45 on the nut holding member 31 side enables the nut member 30 to more smoothly rotate.

(4) The contact portion 45 of the nut holding member 31 is formed to have the curved shape along the curved portion 44 of the nut member 30, that is, the curved portion 46 that configures a part of the spherical surface Q' which is concentric with the spherical surface Q.

In the configuration, the curved portion 44 of the nut member 30 comes even contact with the contact portion 45 (curved portion 46) of the nut holding member 31. In this manner, it is possible to cause the nut member 30 to more smoothly rotate.

(5) The nut holding member 31 is formed by the assembly of the first and second holding portions 35 and 36. The nut member 30 is held on the inner side of the nut accommodating portion 34 in such a way that the nut member is pinched between the first and second holding portions 35 and 36.

In the configuration, it is possible to easily form the nut holding member 31. In addition, an advantage is achieved in that it is possible to facilitate the assembly work.

(6) the seat sliding device 8 includes the damper 37 that is interposed between the nut holding member 31 and the fixing bracket 18.

In the configuration, it is possible to absorb vibration that is transmitted to the nut member 30 via the screw rod 15. In this manner, it is possible to realize great quietness.

Note that the embodiment described above may be modified as follows.

Figure 9:
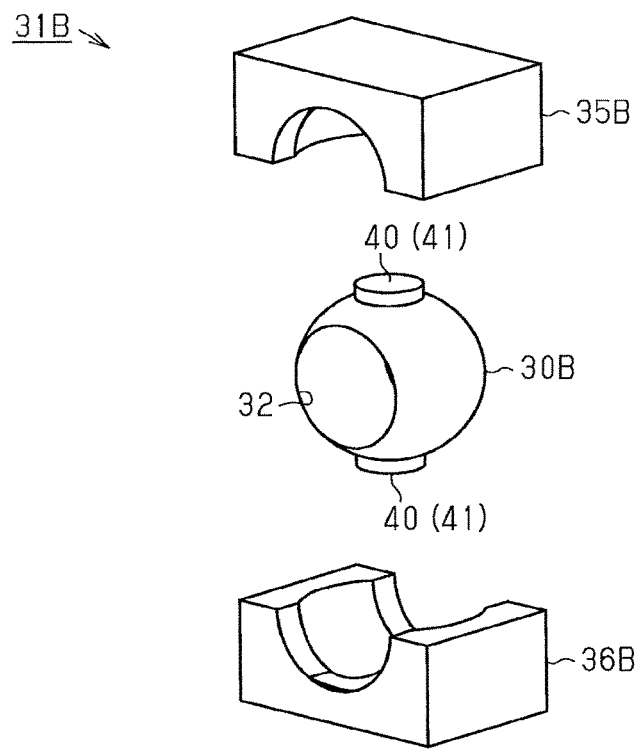
FIG. 9 is an exploded perspective view of an example of the nut member and the nut holding member.
Figure 10:
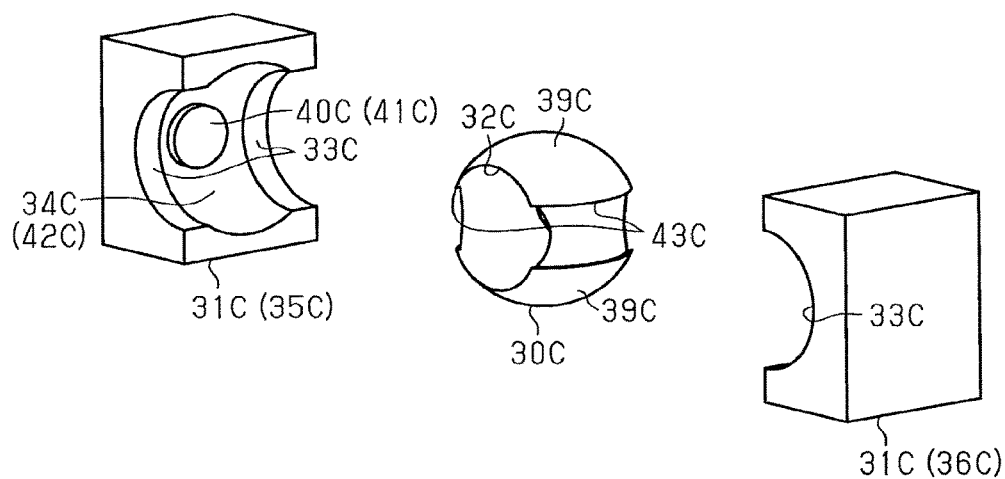
FIG. 10 is an exploded perspective view of another example of the nut member and the nut holding member.
Figure 11A:
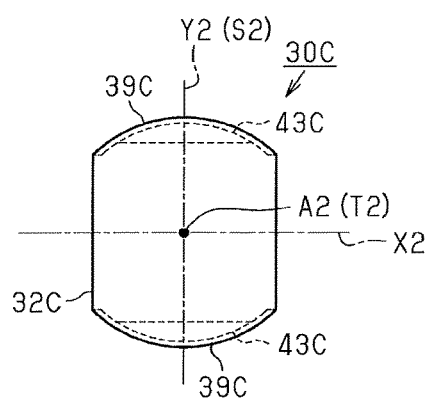
FIG. 11A is a plan view.
Figure 11B:
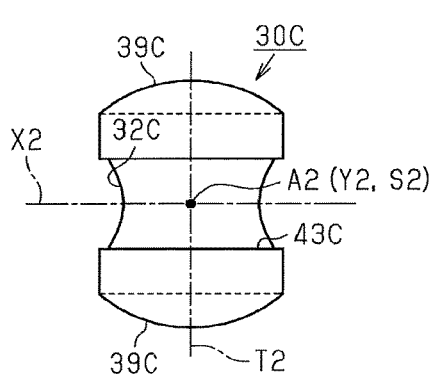
FIG. 11B is a side view.
Figure 11C:
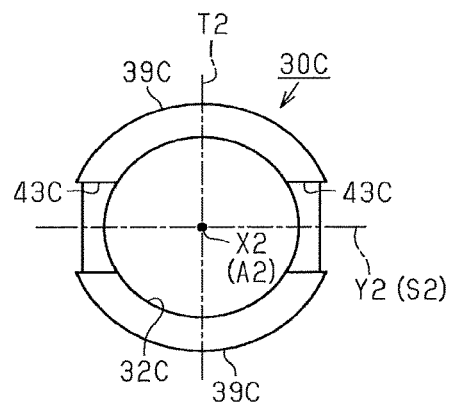
FIG. 11C is a front view.
Figure 12A:
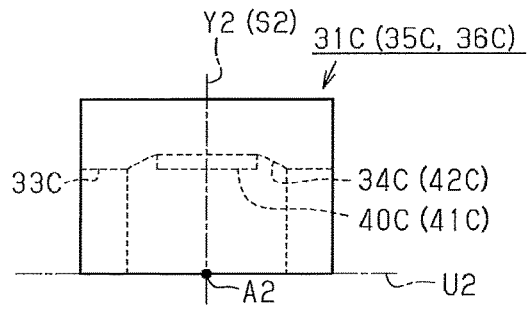
FIG. 12A is a plan view.
Figure 12B:
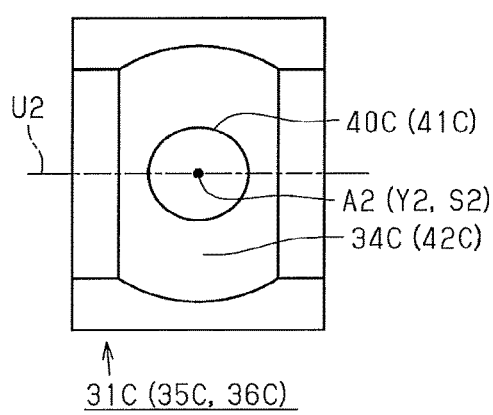
FIG. 12B is a side view.
Figure 12C:
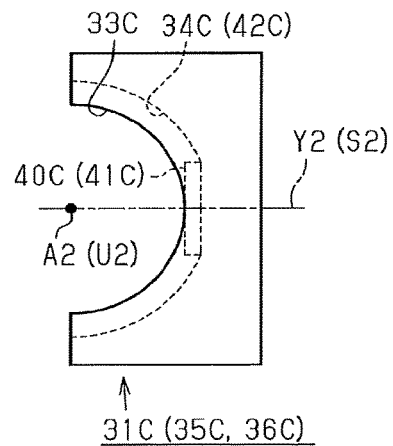
FIG. 12C is a front view.
Figure 13:
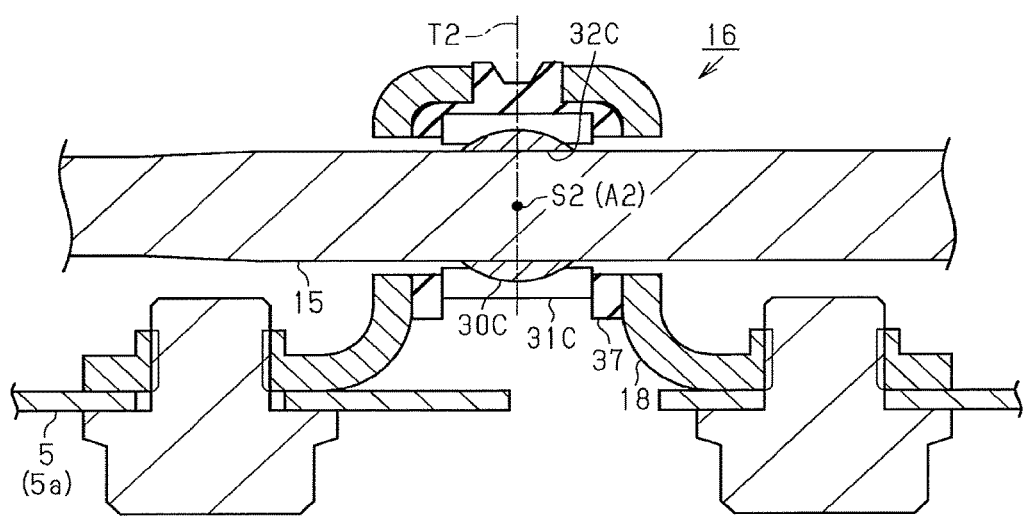
FIG. 13 is a sectional view of the slide-driving nut member in an assembly state to an example of the lower rail.

As illustrated in FIG. 9, a nut holding member 31B may be configured to have a first holding portion 35B and a second holding portion 36B that hold a nut member 30B in a state in which the nut member is pinched on the upper and lower side. Also in such a configuration, it is possible to achieve the same effects as those in the embodiment described above.

In addition, as illustrated in FIGS. 10, 11A to 12C, and 13, a configuration, in which a nut holding member 31C is provided with a support shaft 40C and a nut member 30C is provided with an arcuate groove 43C, may be employed.

More specifically, the nut holding member 31C in this example is also configured to pinch the nut member 30C between a first holding portion 35C and a second holding portion 36C into which the nut holding member 31C is bisected along an axis line U2 of a through-hole 33C thereof.

In addition, the nut holding member 31C is provided with a pair of shaft-shaped projecting portions 41C that have a substantially cylindrical external shape and project to an inner circumferential surface 42C of a nut accommodating portion 34C. Specifically, the shaft-shaped projecting portions 41C are provided at two positions which are opposite in the rail width direction in a state in which the nut holding member 31C is fixed to the lower rail 5. In this example, the shaft-shaped projecting portions 41C form the support shafts 40C having an axis line Y2 extending in the rail width direction.

An outer circumferential surface 39C of the nut member 30C is provided with the arcuate groove 43C extending in a direction along an axis line X2 of a screw hole 32C. The nut member 30C in the example is configured to be held in the nut holding member 31C in a state in which the support shafts 40C of the nut holding member 31C engages with and comes into contact with the arcuate grooves 43C.

In other words, the support shaft 40C of the nut holding member 31C engages with the arcuate groove 43C of the nut member 30C in a relatively rotatable state. In this manner, a first rotation axis S2 of the nut member 30C is formed along the axis line Y2 of the support shaft 40C.

Further, relative movement of the support shaft 40C of the nut holding member 31C in a groove width direction is apparently regulated with respect to the arcuate groove 43C of the nut member 30C, and engages with the arcuate groove in a state of being slidable in the extending direction of the arcuate groove 43C. A second rotation axis T2 of the nut member 30C is formed to be orthogonal to the axis line X2 of the screw hole 32C and the axis line Y2 of the support shaft 40C that forms the first rotation axis S2, that is, to pass through an intersection point A2 of the axis line X2 of the screw hole 32C and the axis line Y2 of the support shaft 40C.

Also in the configuration, similar to the embodiment described above, it is possible to form the first rotation axis S2 and the second rotation axis T2 which intersect with the longitudinal direction of the lower rail 5 in a state in which the rotation axes and the longitudinal direction are orthogonal to each other. In this manner, it is possible to cause the nut member 30C to rotate in compliance with the screw rod 15 that tilts in the vertical direction and the rail width direction of the lower rail 5.

In the embodiment described above, the outer circumferential surface 39 of the nut member 30 is formed of the curved portion 44 that configures a part of the spherical surface Q around the intersection point A of the axis line X of the screw hole 32 and the first rotation axis S and the second rotation axis T. Further, the inner circumferential surface 42 of the nut accommodating portion 34 which is formed of the contact portion 45 with respect to the curved portion 44 on the nut holding member 31 side is also formed to have the curved shape along the curved portion 44, that is, the curved portion 46 that configures a part of the spherical surface Q' which is concentric with the spherical surface Q.

However, the configuration is not limited thereto, and only the outer circumferential surface 39 on the nut member 30 side is set to be the curved portion 44. A configuration, in which, on the nut holding member 31 side, a plurality of protrusions that slidably come into contact with the curved portion 44 are provided as the contact portion 45 with respect to the curved portion 44, may be employed. Conversely, only the inner circumferential surface 42 of the nut accommodating portion 34 provided on the nut holding member 31 side is set to be the curved portion 46. A configuration, in which a plurality of protrusions that function as the contact portion with respect to the curved portion are provided on the nut member 30 side, may be employed.

Further, as described above, in a case where the curved portion (44 or 46) that configures a part of the spherical surface Q around the intersection point A of the first rotation axis S and the second rotation axis T is provided on only one side of the nut member 30 side or the nut holding member 31 side, the shape of the contact portion with respect to the curved portion may be arbitrarily changed. A configuration in which the outer circumferential surface 39 of the nut member 30 and the inner circumferential surface 42 of the nut holding member 31 are not brought into sliding contact with each other is not excluded.

In the embodiment described above, the support shaft 40 of the nut member 30 has the axis line Y orthogonal to the axis line X of the screw hole 32; however, the configuration is not necessarily limited thereto. Further, the arcuate groove 43 of the nut holding member 31 may also be formed at an arbitrarily changed position as long as the arcuate groove extends in the longitudinal direction of the lower rail 5. Further, in the nut holding member 31C in such another example illustrated in FIGS. 10 to 12, the shaft-shaped projecting portions project on the inner circumferential surface 42C of the nut accommodating portion 34C, and thereby a forming position of the shaft-shaped projecting portions 41C that configure the first rotation axis S2 of the nut member 30C may also be arbitrarily changed. In that other example, the forming position of the arcuate groove 43C formed on the outer circumferential surface 39C of the nut member 30C may also be arbitrarily changed as long as the arcuate groove extends in the direction along the axis line X of the screw hole 32C.

In the embodiment described above, the nut holding member 31 is formed by assembly of the first holding portion 35 and the second holding portion 36 into which the nut holding member 31 is bisected; however, the nut holding member may be formed by one or three or more holding portions. In a case where a configuration of assembly of a plurality of such divided holding members is employed, division shape may be arbitrarily changed.

In the embodiment described above, the nut holding member 31 is fixed to the fixing bracket 18 via the damper 37; however, the configuration may not be necessarily employed. For example, the nut holding member 31, the damper 37, and the fixing bracket 18 may be integrally configured. A configuration, in which the damper 37 interposed between the nut holding member 31 and the fixing bracket 18 is not provided, may be employed.

In the embodiment described above, the slide-driving nut member 16 is fixed to the lower rail 5, and the screw rod 15 is supported by the upper rail 6. However, the configuration is not limited thereto, and the nut members 30 (30B and 30C) and the nut holding members 31 (31B and 31C) described in the embodiment and other examples may be applied to a configuration in which the slide-driving nut member 16 is fixed to the upper rail 6, and the screw rod 15 is supported by the lower rail 5.

In the embodiment described above, the support 20 is positioned between the slide-driving nut member 16 and the gear box 17 in the axial direction of the screw rod 15; however, the position of the support 20 may be arbitrarily changed. For example, the support may be disposed at a position closer to the slide-driving nut member 16 than to the gear box 17. Further, a drive position of the screw rod 15 by the gear box 17 may also be arbitrarily changed such as setting the position on the rear end portion 15b side. A support structure of the screw rod 15 at an end portion in the axial direction may also be arbitrarily changed.

It is preferable that a vehicle seat sliding device according to an aspect of this disclosure includes: a lower rail configured to be fixed to a vehicle floor; an upper rail that slidably engages with the lower rail and configured to support a vehicle seat upward; a screw rod that is rotatably supported by a first rail which configures one side of the lower rail and the upper rail; a drive unit that drives rotation of the screw rod; a nut member provided with a screw hole into which the screw rod is screwed; and a nut holding member that is fixed to a second rail which configures the other side of the lower rail and the upper rail, and that holds the nut member, one of the nut member and the nut holding member is provided with a support shaft that forms a first rotation axis of the nut member, the other of the nut member and the nut holding member is provided with an arcuate groove with which the support shaft engages, and the nut holding member regulates integral rotation of the screw rod and the nut member, based on an engagement relationship between the support shaft and the arcuate groove, allows the nut member to rotate around the first rotation axis, and allows the nut member to rotate around a second rotation axis orthogonal to an axis line of the screw hole and the first rotation axis, with the support shaft sliding in an extending direction of the arcuate groove.

According to this configuration, the nut member rotates around the first rotation axis and the second rotation axis in compliance with a tilt of the screw rod, and thereby it is difficult for so-called "skewness" of tilting of the screw rod with respect to the axis line of the screw hole to occur. In this manner, the occurrence of defective mesh between the nut member and the screw rod is reduced, and thus it is possible to ensure a smooth operation of the screw rod.

In the vehicle seat sliding device according to the aspect of this disclosure, it is preferable that the support shaft projects from the outer circumference of the nut member, and the arcuate groove extends in a longitudinal direction of the second rail in an inner circumference of a nut accommodating portion provided in the nut holding member.

According to this configuration, it is possible to form the first rotation axis and the second rotation axis which intersect with the longitudinal direction of the second rail in a state in which the rotation axes and the longitudinal direction are orthogonal to each other. In this manner, it is possible to cause the nut member to rotate in compliance with the screw rod that tilts in a vertical direction and a rail width direction of the second rail. As a result, the occurrence of defective mesh between the nut member and the screw rod is reduced, and thus it is possible to ensure a smooth operation of the screw rod.

In the vehicle seat sliding device according to the aspect of this disclosure, it is preferable that the support shaft projects to the inner circumference of the nut accommodating portion provided on the nut holding member, and the arcuate groove extends in a direction in which the axis line of the screw hole extends in the outer circumference of the nut member.

According to this configuration, it is possible to form the first rotation axis and the second rotation axis which intersect with an extending direction of the screw rod that is screwed into the screw hole of the nut member, that is, the longitudinal direction of the second rail, in a state in which the rotation axes and the longitudinal direction are orthogonal to each other. In this manner, it is possible to cause the nut member to rotate in compliance with the screw rod that tilts in the vertical direction and the rail width direction of the second rail.

In the vehicle seat sliding device according to the aspect of this disclosure, it is preferable that one of the nut member and the nut holding member is provided with a curved portion that configures a part of a spherical surface having the center at a position which is an intersection point of the first rotation axis and the second rotation axis, and the other of the nut member and the nut holding member is provided with a contact portion which slidably comes into contact with the curved portion.

According to this configuration, sliding of the curved portion and the contact portion enables the nut member to more smoothly rotate.

In the vehicle seat sliding device according to the aspect of this disclosure, it is preferable that the contact portion has a curved surface shape along the curved portion.

According to this configuration, the curved portion and the contact portion (curved portion) are brought into even contact with each other. In this manner, it is possible to cause the nut member to more smoothly rotate.

In the vehicle seat sliding device according to the aspect of this disclosure, it is preferable that the nut holding member is provided with a first holding portion and a second holding portion, and the nut member is sandwiched between the first and second holding portions and is held in the nut holding member.

According to this configuration, it is possible to easily form the nut holding member. In addition, an advantage is achieved in that it is possible to facilitate assembly work.

It is preferable that the vehicle seat sliding device according to the aspect of this disclosure further includes: a fixing bracket that fixes the nut holding member to the second rail; and a damper that is interposed between the nut holding member and the fixing bracket.

According to this configuration, it is possible to absorb vibration that is transmitted to the nut member via the screw rod. In this manner, it is possible to realize great quietness.

In the vehicle seat sliding device according to the aspect of this disclosure, it is preferable that the nut member is sandwiched between the first and second holding portions in a rail width direction orthogonal to a longitudinal direction of the second rail and is held in the nut holding member.

According to the aspect of this disclosure, the occurrence of defective mesh between the nut member and the screw rod is reduced, and thus it is possible to ensure a smooth operation of the screw rod.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat sliding device comprising:
   a lower rail configured to be fixed to a vehicle floor;
   an upper rail that slidably engages with the lower rail and configured to support a vehicle seat upward;
   a screw rod that is rotatably supported by a first rail, the first rail being one of the lower rail and the upper rail;
   a drive unit that drives rotation of the screw rod;
   a nut member provided with a screw hole into which the screw rod is screwed; and
   a nut holding member that is fixed to a second rail, the second rail being the other of the lower rail and the upper rail, the nut holding member holds the nut member,
   wherein one of the nut member and the nut holding member is provided with a support shaft that forms a first rotation axis of the nut member,
   the other of the nut member and the nut holding member is provided with an arcuate groove with which the support shaft engages, and
   the nut holding member
   regulates integral rotation of the screw rod and the nut member, based on an engagement relationship between the support shaft and the arcuate groove and allows the nut member to rotate around the first rotation axis, and
   allows the nut member to rotate around a second rotation axis orthogonal to an axis line of the screw hole and the first rotation axis, with the support shaft sliding in an extending direction of the arcuate groove.

2. The vehicle seat sliding device according to claim 1, wherein the support shaft projects from an outer circumference of the nut member, and
   the arcuate groove extends in a longitudinal direction of the second rail in an inner circumference of a nut accommodating portion provided in the nut holding member.

3. The vehicle seat sliding device according to claim 1, wherein the support shaft projects to an inner circumference of a nut accommodating portion provided on the nut holding member, and
   the arcuate groove extends in a direction in which the axis line of the screw hole extends in an outer circumference of the nut member.

4. The vehicle seat sliding device according to claim 1, wherein one of the nut member and the nut holding member is provided with a curved portion that forms a part of a spherical surface having a center at a position which is an intersection point of the first rotation axis and the second rotation axis, and
   the other of the nut member and the nut holding member is provided with a contact portion which slidably comes into contact with the curved portion.

5. The vehicle seat sliding device according to claim 4, wherein the contact portion has a curved surface shape along the curved portion.

6. The vehicle seat sliding device according to claim 1, wherein the nut holding member is provided with a first holding portion and a second holding portion, and
   the nut member is sandwiched between the first and second holding portions and is held in the nut holding member.

7. The vehicle seat sliding device according to claim 1, further comprising:
   a fixing bracket that fixes the nut holding member to the second rail; and
   a damper that is interposed between the nut holding member and the fixing bracket.

8. The vehicle seat sliding device according to claim 1, wherein the nut member is sandwiched between a first holding portion and a second holding portions in a rail width direction orthogonal to a longitudinal direction of the second rail and is held in the nut holding member.

* * * * *